UNITED STATES PATENT OFFICE.

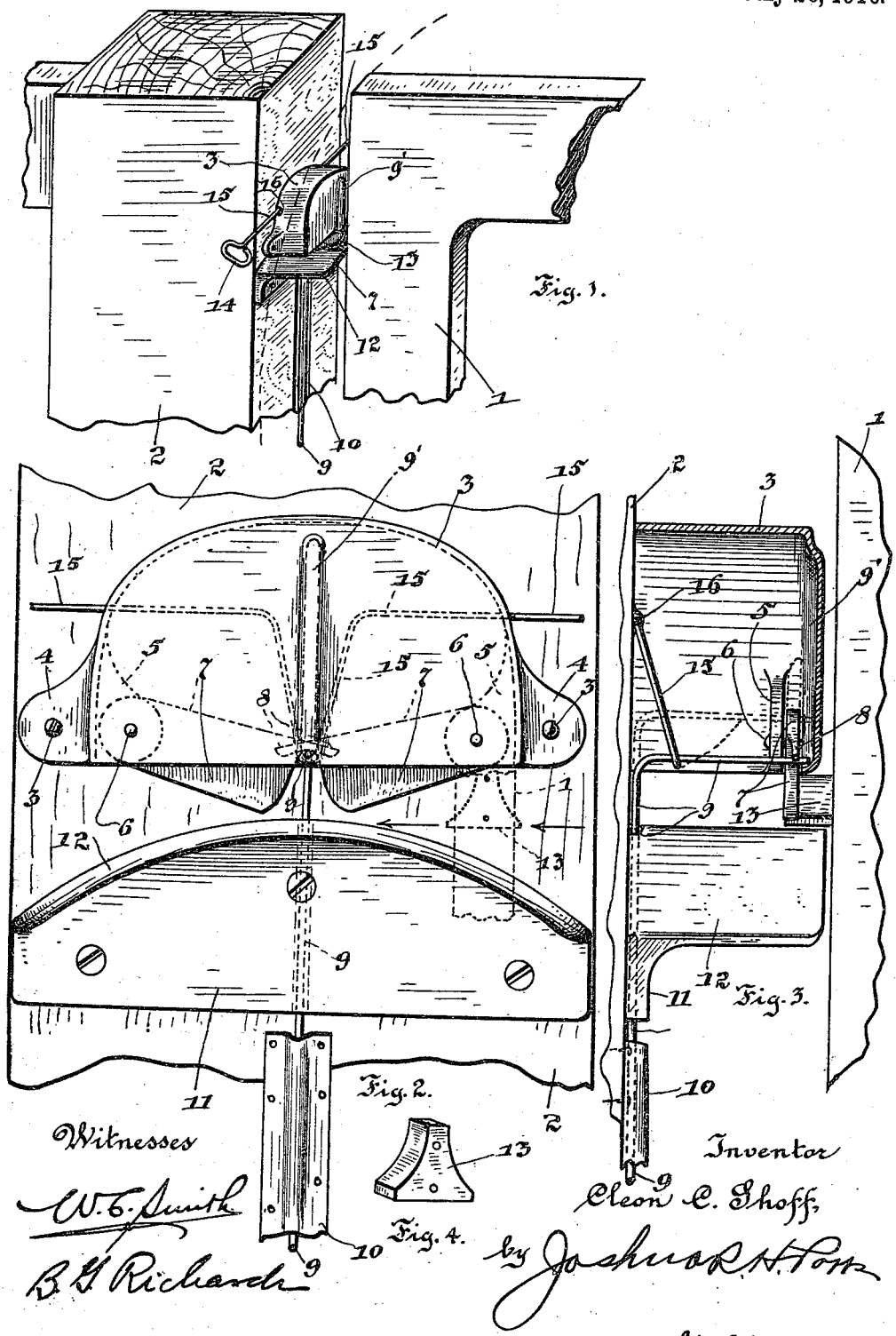

CLEON C. SHOFF, OF SPRINGFIELD, MISSOURI.

GATE-LATCH.

965,238. Specification of Letters Patent. Patented July 26, 1910.

Application filed February 14, 1910. Serial No. 543,808.

*To all whom it may concern:*

Be it known that I, CLEON C. SHOFF, a citizen of the United States, residing at Springfield, county of Greene, and State of Missouri, have invented certain new and useful Improvements in Gate-Latches, of which the following is a specification.

My invention relates to improvements in gate latches and has for its object the production of a device of this character which shall be inexpensive of manufacture and efficient in its operation.

A further object of my invention is to provide a gate latch the mechanism of which shall be protected from the weather, thereby rendering the device not only more durable but compact and neat in appearance.

Other objects will appear hereinafter.

With these objects in view my invention consists in the novel construction and arrangement of parts which will be hereinafter fully described and more particularly pointed out in the appended claims.

My invention will be more readily understood by reference to the accompanying drawings forming a part of this specification, and in which, Figure 1 is a perspective view showing my improved gate latch in its preferred form, Fig. 2 is a front elevation of the portion thereof which is attached to the gate post, Fig. 3 is substantially a vertical section, and Fig. 4 is a detail perspective view showing the portion of the latch which is attached to the gate.

Referring now to the drawings 1 designates a portion of an ordinary gate which is adapted to swing as indicated by dotted lines in Fig. 1.

2 designates the gate post and 3 a bottomless casing attached thereto by means of screws 3 which pass through the perforated lugs 4 projecting from said casing. Projecting inwardly from the sides of the casing 3 are perforated lugs 5 and pivoted thereto by means of the rivets 6 are swinging dogs 7 the latter having reduced extensions 8 arranged adjacent to each other. These extensions are supported by a horizontal portion of an L-shaped wire 9 which is mounted in a member 10 and adapted to have vertical movement therein. The member 10 is U-shaped in cross section and is securely attached to the gate post 2 by means of nails, as shown in Fig. 3. Arranged beneath the dogs 7 and securely attached to the post 2 is a transversely extending member 11 having a forwardly projecting convex flange 12 the purpose of which is to support and guide a member 13 which is secured to the gate 1.

In order to close the gate the same is moved to the position as indicated by dotted lines in Fig. 2. Further movement, as indicated by arrows, causes the member 13 to raise one of the dogs 7 by sliding under its lower surface. When the member 13 abuts the free end of the other dog 7 the first dog will fall and lock said member in position.

In order to unlock the gate a dog 7 and the wire 9 must be raised and in order to accomplish this the handle 14 is turned, which handle is provided at the outer extremity of a horizontally disposed wire 15 journaled in the recesses 16 of the casing 3, said wire being provided with a bent portion constituting a crank which engages the wire 9 and is adapted to move in the direction indicated in Fig. 3 in raising the wire 9.

It will be noted that the gate may be opened in either direction and will be automatically locked when moved to the closing position.

While I have shown what I deem to be the preferred form of my improved gate latch I do not wish to be limited thereto as there might be various changes made in the details of construction and arrangement of parts described without departing from the spirit of the invention, and hence I desire to avail myself of such changes and modifications as fairly fall within the scope of the appended claims.

Having described my invention what I claim as new and desire to secure by Letters Patent is:

1. A device of the class described comprising pivoted opposed dogs having overlapping extensions; an L-shaped wire supporting said extensions and mounted to slide vertically, and a wire provided with a crank-arm bend embracing said L-shaped wire, substantially as described.

2. In a device of the class described, in combination with a gate and gate post, a bottomless casing secured to said gate post on the side thereof adjacent said gate, two lugs projecting into said casing from opposite sides thereof and located adjacent the front of said casing, a dog adapted to swing in a vertical plane pivoted to each of said lugs, a reduced extension on the end of each dog adjacent to each other, the main surfaces of the free ends of said dogs being spaced apart, an L-shaped member, a vertical member U-shaped in cross section adapted to guide said L-shaped member and to permit a vertical movement, means for lifting said L-shaped member consisting of a horizontally disposed wire journaled in said casing having a handle at its outer extremity and a substantially U-shaped bend constituting a crank portion adapted to engage said L-shaped member, a convex member secured to said post adjacent the under side of said dogs, and a member secured to said gate adapted to be guided by said last named member, substantially as described.

In testimony whereof I have signed my name to this specification in the presence of two subscribing witnesses.

CLEON C. SHOFF.

Witnesses:
JOSHUA R. H. POTTS,
W. C. SMITH.